(12) United States Patent
Wemhoener

(10) Patent No.: US 9,394,939 B2
(45) Date of Patent: Jul. 19, 2016

(54) BEARING SYSTEM AND METHODS OF USE THEREOF

(71) Applicant: New Hampshire Ball Bearings, Inc., Chatsworth, CA (US)

(72) Inventor: Jens Wemhoener, Aachen (DE)

(73) Assignee: CEROBEAR GMBH, Herzogenrath (DE)

( * ) Notice: Subject to any disclaimer, the term of this patent is extended or adjusted under 35 U.S.C. 154(b) by 64 days.

(21) Appl. No.: 14/169,590

(22) Filed: Jan. 31, 2014

(65) Prior Publication Data

US 2015/0219148 A1 Aug. 6, 2015

(51) Int. Cl.
| | |
|---|---|
| F16C 23/04 | (2006.01) |
| F16C 23/08 | (2006.01) |
| F16C 19/54 | (2006.01) |
| F16K 1/22 | (2006.01) |
| F16C 19/26 | (2006.01) |
| F16C 33/36 | (2006.01) |

(52) U.S. Cl.
CPC .............. *F16C 23/084* (2013.01); *F16C 19/26* (2013.01); *F16C 19/54* (2013.01); *F16C 19/546* (2013.01); *F16C 23/086* (2013.01); *F16C 23/088* (2013.01); *F16C 33/36* (2013.01); *F16K 1/224* (2013.01); *F16C 2240/50* (2013.01); *F16C 2360/23* (2013.01); *F16C 2361/91* (2013.01)

(58) Field of Classification Search
CPC ...... F16C 19/52; F16C 19/522; F16C 19/525; F16C 19/52754; F16C 19/546; F16C 23/06; F16C 23/082; F16C 23/084; F16C 23/086; F16C 2206/40; F16C 2204/52; F16C 2204/60; F16C 2361/91; F16C 19/527; F16C 19/54; F16K 1/224; F16K 1/225

USPC .................... 384/493, 557, 447, 558
See application file for complete search history.

(56) References Cited

U.S. PATENT DOCUMENTS

| | | | |
|---|---|---|---|
| 1,226,685 A | 5/1917 | Modler | |
| 3,370,900 A | 2/1968 | Messerschmidt | |
| 6,210,043 B1* | 4/2001 | Detweiler | F16C 19/54 384/493 |
| 7,703,746 B2 | 4/2010 | Habibvand | |

(Continued)

FOREIGN PATENT DOCUMENTS

| | | |
|---|---|---|
| EP | 2484925 | 8/2012 |
| EP | 2 589 829 A1 | 5/2013 |
| FR | 517696 | 5/1921 |

(Continued)

OTHER PUBLICATIONS

International Search Report and Written Opinion from related PCT Appln. No. PCT/IB2015/000096 dated Jun. 3, 2015.

*Primary Examiner* — James Pilkington
(74) *Attorney, Agent, or Firm* — Grossman, Tucker, Perreault & Pfleger, PLLC

(57) ABSTRACT

A bearing system, which may be used particularly for hot-air valves, comprising a fixed roller bearing and a floating roller bearing is provided wherein a spherical shape of the inner raceways of each bearing, a spherical shape of the rollers of each bearing, a spherical shape of the fixed bearing's outer raceway and a cylindrical shape of the floating bearing's outer raceway may enable the bearing system to compensate for all mechanically and thermally induced deflections and linear expansion of a valve's shaft relative to the valve's housing, thus reducing a risk of shortening the useful lifetime of either the fixed roller bearing or the floating roller bearing.

22 Claims, 6 Drawing Sheets

(56) References Cited

U.S. PATENT DOCUMENTS 8,157,451 B2 * 4/2012 Solfrank .......... F16C 19/46
384/457
2014/0004964 A1 * 1/2014 Nevers .......... F16C 23/084
464/180

FOREIGN PATENT DOCUMENTS

| WO | 2012/030222 | 3/2012 |
| WO | 2013/162436 | 10/2013 |
| WO | 2013180858 A1 | 12/2013 |

* cited by examiner

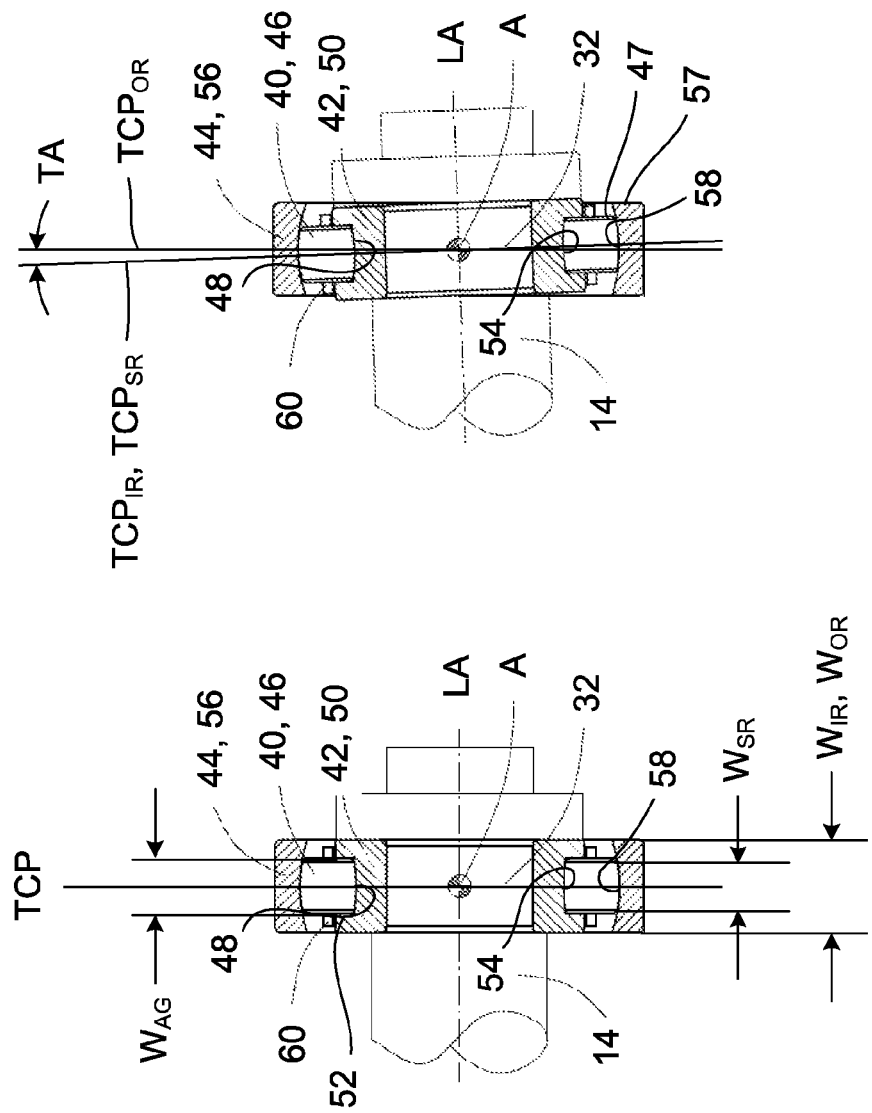

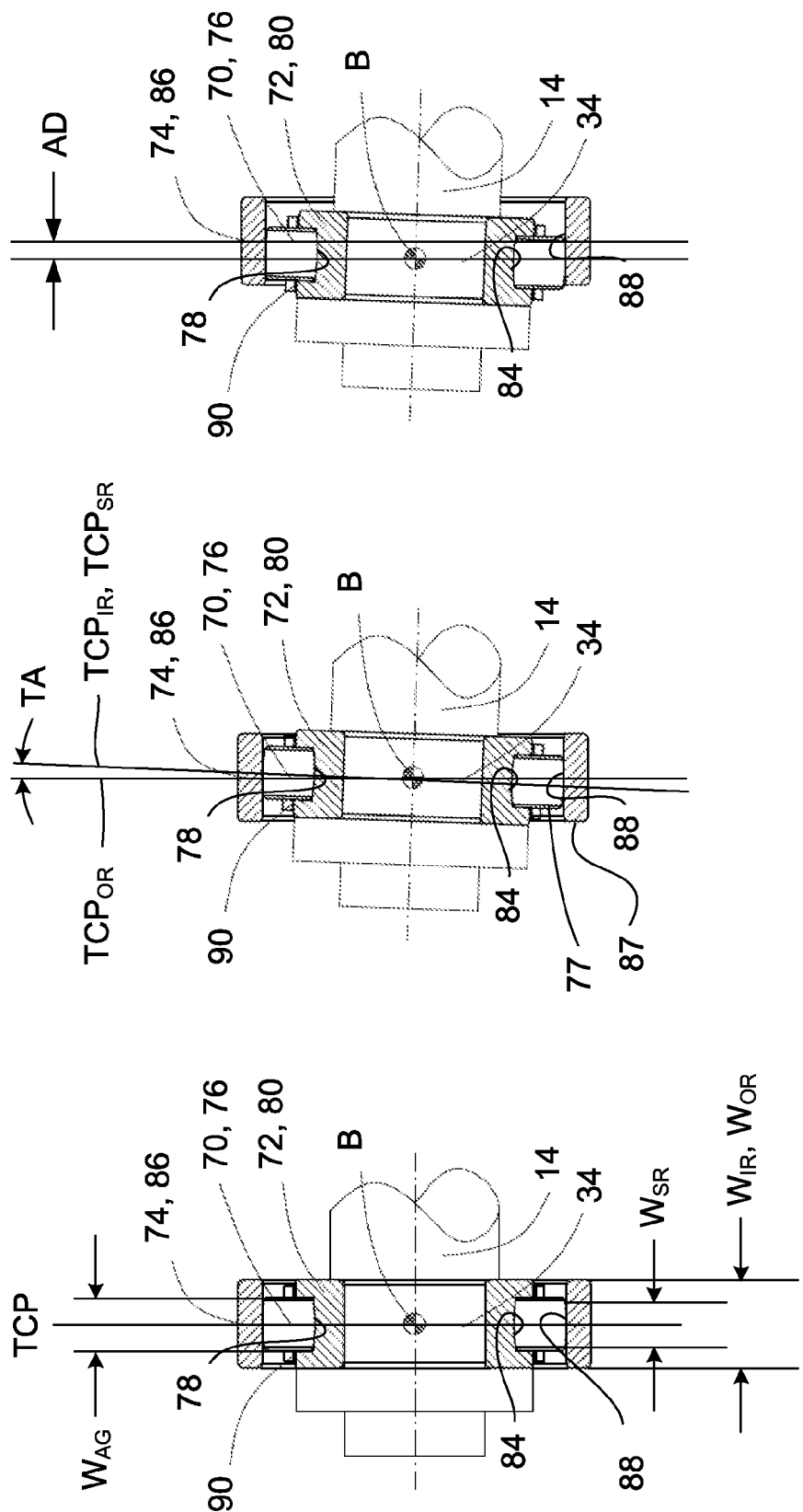

BEARING SYSTEM AND METHODS OF USE THEREOF

FIELD

The present disclosure relates to a bearing system, and methods of use thereof, particularly for hot-air valves.

BACKGROUND

A hot-air valve may be used to regulate gas flow in different areas of a gas turbine engine, particularly for aircraft or power generation applications. In certain cases the hot-air valve may have a so called butterfly design, in which a shaft and a disc fixed to the shaft regulate the gas flow through the hot-air valve, particularly by opening and closing a tubular cross-section of a gas line containing the gas flow by a quarter-turn of the shaft. The gas flowing through the hot-air valve may be characterized by a wide temperature range from 219.3 K (−65° F.) to 810.9 K (1,000° F.), and a pressure range from 68.95 kPa (10 psi) to 1.379 MPa (200 psi).

With the objective of rotating the shaft and disc with minimum torque, even under full pressure, the shaft may be supported at each end by a low friction rolling element ball bearing. Each of the low friction rolling element ball bearings may comprise a rotating inner ring fixed to the shaft and a standing outer ring fixed to a housing, with balls as rolling elements in between.

The need for lower fuel consumption of gas turbines, particularly in the aviation industry, has led to a need to operate hot-air valves with higher gas temperatures and higher gas pressures. For example, for an upcoming new gas turbine engine planned to power single aisle, double engine aircraft like the Boeing 737max or the Airbus 320neo, the requirements of the hot-air valve have been increased to a temperature range of 219.3 K (−65° F.) to 977.6 K (1,300° F.) and a pressure of up to 3.103 MPa (450 psi).

Although thermo and mechanical loads have increased in this new application, the size and weight of the valve may not increase, as such would offset the fuel consumption decrease. As a result, all parts of the hot-air valve may be expected to experience larger thermal expansion/displacement caused by the increased temperature range, and larger mechanical deflection caused by the higher pressure and the decreasing stiffness of the valve materials with the increased temperature. More particularly, the shaft may be expected to show more elastic deflection and more linear extension relative to the housing, which has to be compensated by the bearings to avoid the risk of additional internal loads between the bearing elements resulting in a shortened useful life of the bearing.

In light of the foregoing, a need exists in industry to address the aforementioned deficiencies and inadequacies of current low friction rolling element ball bearings, particularly for hot-air valves in aviation applications exposed to the above described increased thermal and mechanical requirements.

SUMMARY

A bearing system, which may be used particularly for hot-air valves, comprising a fixed roller bearing and a floating roller bearing is provided wherein a spherical shape of the inner raceways of each bearing, a spherical shape of the rollers of each bearing, a spherical shape of the fixed bearing's outer raceway and a cylindrical shape of the floating bearing's outer raceway may enable the bearing system to compensate for all mechanically and thermally induced deflections and linear expansion of a valve's shaft relative to the valve's housing, thus reducing a risk of shortening the useful lifetime of either the fixed roller bearing or the floating roller bearing.

In one embodiment of the present disclosure, a bearing system is provided which comprises a fixed roller bearing and a floating roller bearing. The fixed roller bearing comprises a fixed bearing inner raceway having a width formed by a spherical surface, wherein the spherical surface is defined by a radius; a fixed bearing outer raceway having a width formed by a spherical surface, wherein the spherical surface is defined by a radius; and a plurality of fixed bearing spherical rollers located between the fixed bearing inner raceway and the fixed bearing outer raceway. The floating roller bearing comprises a floating bearing inner raceway having a width formed by a spherical surface, wherein the spherical surface is defined by a radius; a floating bearing outer raceway having a width formed by a cylindrical surface; and a plurality of floating bearing spherical rollers located between the fixed bearing inner raceway and the fixed bearing outer raceway.

In another embodiment of the present disclosure a hot-air valve is provided which comprises a shaft rotatable on at least two bearings located within a housing, wherein a first bearing of the two bearings is a fixed roller bearing and a second bearing of the two bearings is floating roller bearing. The fixed roller bearing comprises a fixed bearing inner raceway having a width formed by a spherical surface, wherein the spherical surface is defined by a radius; a fixed bearing outer raceway having a width formed by a spherical surface, wherein the spherical surface is defined by a radius; and a plurality of fixed bearing spherical rollers located between the fixed bearing inner raceway and the fixed bearing outer raceway. The floating roller bearing comprises a floating bearing inner raceway having a width formed by a spherical surface, wherein the spherical surface is defined by a radius; a floating bearing outer raceway having a width formed by a cylindrical surface; and a plurality of floating bearing spherical rollers located between the fixed bearing inner raceway and the fixed bearing outer raceway. The valve is operable in a temperature range of at least 219.3 K (−65° F.) to 977.6 K (1,300° F.), and/or to a pressure of up to 3.103 MPa (450 psi).

In another embodiment of the present disclosure a method of operating a valve is provided which comprises providing a hot-air valve, comprising a shaft rotatable on at least two bearings located within a housing, wherein a first bearing of the two bearings is a fixed roller bearing and a second bearing of the two bearings is floating roller bearing. The fixed roller bearing comprises a fixed bearing inner raceway having a width formed by a spherical surface, wherein the spherical surface is defined by a radius; a fixed bearing outer raceway having a width formed by a spherical surface, wherein the spherical surface is defined by a radius; and a plurality of fixed bearing spherical rollers located between the fixed bearing inner raceway and the fixed bearing outer raceway. The floating roller bearing comprises a floating bearing inner raceway having a width formed by a spherical surface, wherein the spherical surface is defined by a radius; a floating bearing outer raceway having a width formed by a cylindrical surface; and a plurality of floating bearing spherical rollers located between the fixed bearing inner raceway and the fixed bearing outer raceway. The method may further comprise exposing the shaft to mechanical loads which bend the shaft along an axis of rotation of the shaft, and compensating for the bending of the shaft and mechanical loads placed on the fixed bearing and floating bearing by tilting the fixed bearing inner ring in the fixed bearing outer ring relative to the axis of rotation and tilting the floating bearing inner ring in the floating bearing outer ring relative to the axis of rotation and/or exposing the shaft to thermal loads which lengthen the shaft axially, and compensating for the lengthening of the shaft by displacing the floating bearing inner ring axially within the floating bearing outer ring.

FIGURES

The above-mentioned and other features of this disclosure, and the manner of attaining them, will become more apparent and better understood by reference to the following description of embodiments described herein taken in conjunction with the accompanying figures, wherein:

FIG. 2A depicts a cross-sectional view of a fixed bearing of the rolling bearing system of FIG. 1 with an inner ring and an outer ring aligned to each other;

FIG. 2B depicts a cross-sectional view of the fixed bearing of the rolling bearing system of FIG. 2A with the inner ring tilted relatively to the outer ring;

FIG. 3A depicts a cross-sectional view of a floating bearing of the rolling bearing system of FIG. 1 with an inner and an outer ring aligned to each other;

FIG. 3B depicts a cross-sectional view of the floating bearing of the rolling bearing system of FIG. 3A with the inner ring tilted relatively to the outer ring;

FIG. 3C depicts a cross-sectional view of the floating bearing of the rolling bearing system of FIG. 3A with the inner ring tilted and displaced axially relatively to the outer ring;

DETAILED DESCRIPTION

Figure 1:
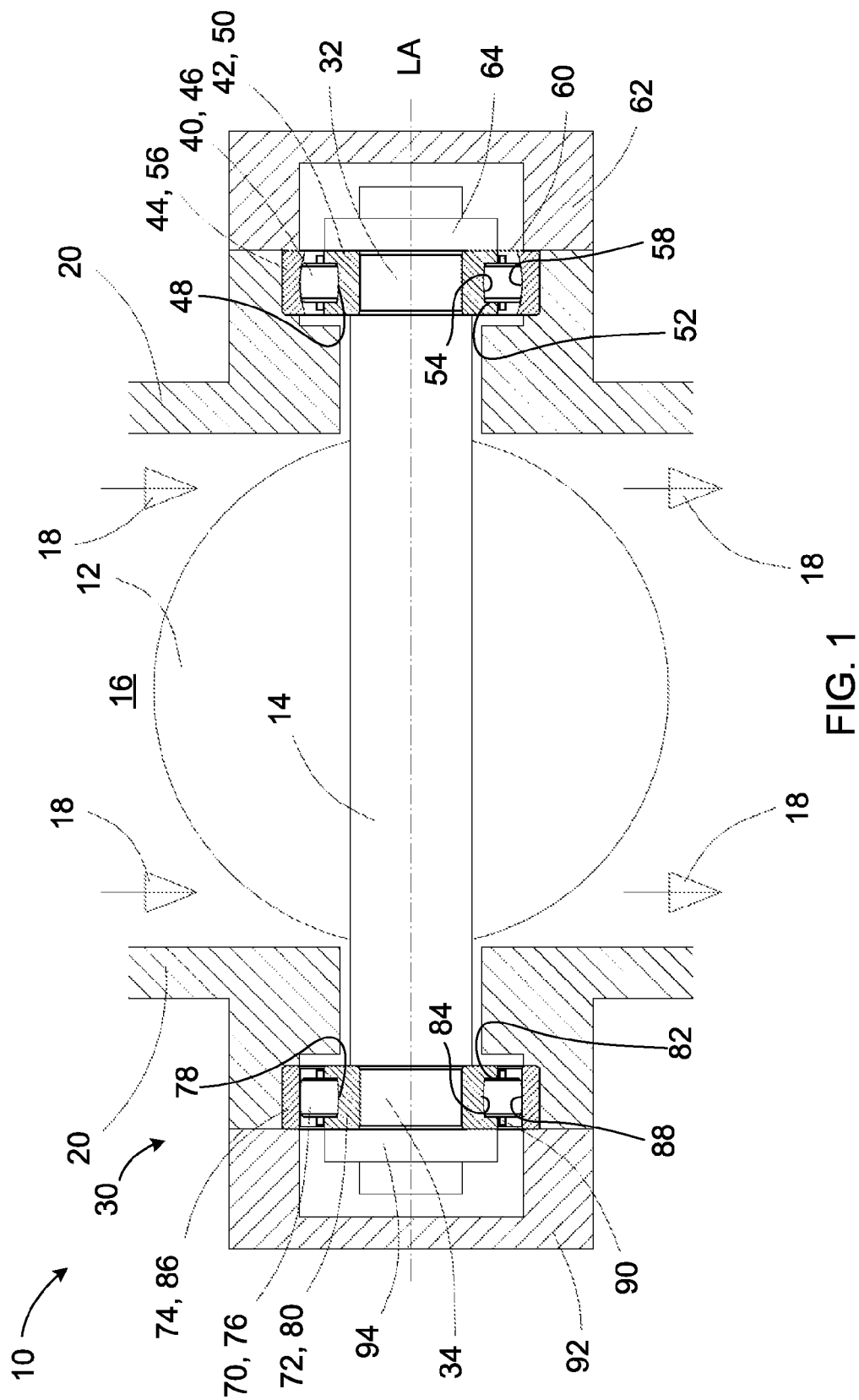
FIG. 1 depicts a cross-sectional view of a hot-air valve in an open configuration/position with a rolling bearing system constructed in accordance with the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Broadly, the present disclosure provides a rolling bearing system for hot-air valves wherein the rolling bearing system may compensate for all mechanically induced deflection and thermally induced linear expansion of the valve shaft relative to the valve housing without generating additional internal loads between the bearing elements.

Referring now to the FIGS. 1 and 2A-2C, FIG. 1 depicts a cross-sectional view of a hot-air valve 10 according to the present disclosure. Hot-air valve 10 may be particularly configured and arranged, through design and selection of materials, to operate over a temperature range of 219.3 K (−65°) F. to 977.6 K (1,300° F.), and/or to a pressure of up to 3.103 MPa (450 psi), such as for aviation (aircraft) applications.

As shown, hot-air valve 10 comprises a planar, circular valve baffle 12, in the form of a disc, coupled to a rotatable shaft 14. Valve baffle 12 is used to open and close a circular hot-air passageway 16, particularly with a quarter-turn of rotatable shaft 14 in a known manner. As shown, valve baffle 12 is in open configuration or position. In such position, the hot-air 18 can pass through the valve 10 since the valve baffle 12 is aligned parallel to the hot-air flow 18.

Rotatable shaft 14 may be assembled and seated in a tubular (circular) shaped housing 20 which defines hot-air passageway 16. Rotatable shaft 14 may be arranged to rotate relative to housing 20, particularly to open and close hot-air passageway 16 with valve baffle 12, with the assistance of a rolling bearing system 30 which comprises at least one bearing 32, 34 which encompasses each opposing end of the rotatable shaft 14. As shown, bearing 32 more particularly comprises a fixed bearing, while bearing 34 more particularly comprises a floating bearing. The bearings 32, 34 may have an outer diameter in a range of 1.27 cm (0.5 inch) to 12.7 cm (5.0 inch).

As used herein, a fixed bearing 32 may be understood as a bearing which is configured and arranged to inhibit axial displacement between the shaft 14 and the housing 20, while a floating bearing 34 may be understood as a bearing which is configured and arranged to permit axial displacement between the shaft 14 and the housing 20, such as due to thermal expansion and contraction of the shaft 14 relative to the housing 20.

The fixed bearing 32 may comprise a plurality of rollers 40 (as opposed to balls) located between an inner race 42 and outer race 44. In such instance, fixed bearing 32 may be more accurately referred to as a fixed roller bearing. As shown, rollers 40 more particularly comprise spherical rollers 46.

The spherical rollers 46 may comprise one or more of the following materials: martensitic stainless steel (e.g. BG42), nickel/cobalt base alloy (e.g. MP159) and ceramic (e.g. silicon nitride, partially stabilized zirconia, fully stabilized zirconia, silicon carbide and alumina). The spherical rollers 46 may also essentially consist of, or consist of, martensitic stainless steel (e.g. BG42), nickel/cobalt base alloy (e.g. MP159) and ceramic (e.g. silicon nitride, partially stabilized zirconia, fully stabilized zirconia, silicon carbide and alumina).

The spherical rollers 46 have a convex spherical roller surface 48 which extends along the longitudinal axis/width $W_{SR}$ of the spherical roller 46 and completely around the outer circumference of the spherical roller 46, which results in the spherical roller 46 increasing in diameter from the longitudinal side end faces 47 of the spherical roller 46 to the longitudinal center of the spherical roller 46, with the longitudinal center of the spherical roller 46 having the greatest diameter.

As shown, the curvature of the spherical roller surface 48 is defined by a constant radius which extends continuously along the complete longitudinal axis/width $W_{SR}$ of the spherical roller 46. However, it should be understood that in other embodiments, the curvature of the spherical roller surface 48 may be defined by a constant radius which extends only along a substantial portion of longitudinal axis/width $W_{SR}$ of the spherical roller 46, such as greater than 90% of the longitudinal axis/width $W_{SR}$ of the spherical roller 46.

The inner race 42 may be formed unitary with the shaft 14 (i.e. as a single component) or, more particularly, may be formed as a separate component. As shown, inner race 42 is formed as a separate component from shaft 14, particularly as a single piece annular inner ring 50. Inner ring 50 is mechanically coupled to the shaft 14 such that the inner ring 50 remains in a fixed position relative to the shaft 14, i.e. does not move axially along the length of the shaft 14 or rotate independent of the shaft 14. The inner ring 50 may be mechanically coupled to the shaft 14 via an interference (press) fit.

Inner ring 50 may comprise one or more of the following materials: martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Inner ring 50 may also essentially consist of, or consist of, martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Inner ring 50 further comprises a U-shaped annular groove 52 into which spherical rollers 46 may be seated. As shown, the bottom of the annular groove 52 has a concave spherical raceway surface 54 which extends along the longitudinal axis/width $W_{AG}$ of the annular groove 52 and completely around the outer circumference of the inner ring 50. Also as shown, the concave spherical raceway surface 54 of inner ring 50 has a spherical curvature which is substantially the same as the spherical curvature of the convex spherical roller surface 48 of spherical rollers 46. More particularly, the concave spherical raceway surface 54 of inner ring 50 is defined by a radius which is substantially equal (i.e. within design tolerance) to the radius which defines the convex spherical roller surface 48 of spherical rollers 46. However, in alternative embodiments, the concave spherical raceway surface 54 of inner ring 50 may be defined by a radius which is greater than the radius which defines the convex spherical roller surface 48 of spherical rollers 46. For example, the concave spherical raceway surface 54 of inner ring 50 may be defined by a radius which is 1% to 10% greater than the radius which defines the convex spherical roller surface 48 of spherical rollers 46.

As shown, the curvature of the spherical raceway surface 54 is defined by a constant radius which extends continuously along the complete longitudinal axis/width $W_{AG}$ of the annular groove 52. However, it should be understood that in other embodiments, the curvature of the spherical raceway surface 54 may be defined by a constant radius which extends only along a substantial portion of longitudinal axis/width $W_{AG}$ of the annular groove 52, such as greater than 90% of the longitudinal axis/width $W_{AG}$ of the annular groove 52.

The outer race 44 may be formed unitary with the housing 20 (i.e. as a single component) or, more particularly, may be formed as a separate component. As shown, outer race 44 is formed as a separate component from housing 20, particularly as a single piece annular outer ring 56. Outer ring 56 is mechanically coupled to the housing 20 such that the outer ring 56 remains in a fixed position relative to the housing 20. The outer ring 56 may be mechanically coupled to the housing 20 via an interference (press) fit.

Outer ring 56 may comprise one or more of the following materials: martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Outer ring 56 may also essentially consist of, or consist of, martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Outer ring 56 further comprises a concave spherical raceway surface 58. As shown, the concave spherical raceway surface 58 of outer ring 56 extends along the longitudinal axis/width $W_{OR}$ of the outer ring 56 and completely around the inner circumference of the outer ring 56. Also as shown, the concave spherical raceway surface 58 of outer ring 56 has a spherical curvature which is substantially the same as the spherical curvature of the convex spherical roller surface 48 of spherical roller 46. More particularly, the concave spherical raceway surface 58 of outer ring 56 is defined by a radius which is substantially equal (i.e. within design tolerance) to the radius which defines the convex spherical roller surface 48 of spherical roller 46. However, in alternative embodiments, the concave spherical raceway surface 58 of outer ring 56 may defined by a radius which is greater than the radius which defines the convex spherical roller surface 48 of spherical roller 46. For example, the concave spherical raceway surface 58 of outer ring 56 may defined by a radius which is 1% to 10% greater than the radius which defines the convex spherical roller surface 48 of spherical roller 46.

As shown, the curvature of the spherical raceway surface 58 is defined by a constant radius which extends continuously along the complete longitudinal axis/width $W_{OR}$ of the outer ring 56. However, it should be understood that in other embodiments, the curvature of the spherical raceway surface 58 may be defined by a constant radius which extends only along a substantial portion of longitudinal axis/width $W_{OR}$ of the outer ring 56, such as greater than 90% of the longitudinal axis/width $W_{OR}$ of the outer ring 56.

The fixed bearing 32 may additionally include a cage 60, which separates the spherical rollers 46 from each other. The optional cage 60 may be guided by the lands of the inner ring 50 and/or by the side faces 47 and/or the outer diameter of the spherical rollers 46.

A possible mechanical means to hold the outer ring 56 of the fixed bearing 32 in the housing 20 may be cover 62. A possible mechanical means to hold the inner ring 50 of the fixed bearing 32 to the shaft 14 may be fastener (nut) 64.

Referring now to FIGS. 1 and 3A-3D, the floating bearing 34 may comprise a plurality of rollers 70 (as opposed to balls) located between an inner race 72 and outer race 74. In such instance, floating bearing 34 may be more accurately referred to as a floating roller bearing. As shown, the rollers 70 more particularly comprise spherical rollers 76. The spherical rollers 76 may comprise or essentially consist of ceramic, and more particularly silicon nitride.

The spherical rollers 76 have a convex spherical roller surface 78 which extends along the longitudinal axis/width $W_{SR}$ of the spherical roller 76 and completely around the outer circumference of the spherical roller 76, which results in the spherical roller 76 increasing in diameter from the longitudinal side end faces 77 of the spherical roller 76 to the longitudinal center of the spherical roller 76, with the longitudinal center of the spherical roller 76 having the greatest diameter.

As shown, the curvature of the spherical roller surface 78 is defined by a constant radius which extends continuously along the complete longitudinal axis/width $W_{SR}$ of the spherical roller 76. However, it should be understood that in other embodiments, the curvature of the spherical roller surface 78 may be defined by a constant radius which extends only along a substantial portion of longitudinal axis/width $W_{SR}$ of the spherical roller 76, such as greater than 90% of the longitudinal axis/width $W_{SR}$ of the spherical roller 76.

The inner race 72 may be formed unitary with the shaft 14 (i.e. as a single component) or, more particularly, may be formed as a separate component. As shown, inner race 72 is formed as a separate component from shaft 14, particularly as a single piece annular inner ring 80. Inner ring 80 is mechanically coupled to the shaft 14 such that the inner ring 80 remains in a fixed position relative to the shaft 14, i.e. does not move axially along the length of the shaft 14 or rotate independent of the shaft 14. The inner ring 80 may be mechanically coupled to the shaft 14 via an interference (press) fit.

Inner ring 80 may comprise one or more of the following materials: martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Inner ring 80 may also essentially consist of, or consist of, martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Inner ring 80 further comprises a U-shaped annular groove 82 into which spherical rollers 76 may be seated. As shown, the bottom of the annular groove 72 has a concave spherical raceway surface 84 which extends along the longitudinal axis/width $W_{AG}$ of the annual groove 82 and completely around the outer circumference of the inner ring 80. Also as shown, the concave spherical raceway surface 84 of inner ring 80 has a spherical curvature which is substantially the same as the spherical curvature of the convex spherical roller surface 48 of spherical roller 46. More particularly, the concave spherical raceway surface 84 of inner ring 80 is defined by a radius which is substantially equal (i.e. within design tolerance) to the radius which defines the convex spherical roller surface 78 of spherical roller 76. However, in alternative embodiments, the concave spherical raceway surface 84 of inner ring 80 may defined by a radius which is greater than the radius which defines the convex spherical roller surface 78 of spherical roller 76. For example, the concave spherical raceway surface 84 of inner ring 80 may defined by a radius which is 1% to 10% greater than the radius which defines the convex spherical roller surface 78 of spherical roller 76.

As shown, the curvature of the spherical raceway surface 84 is defined by a constant radius which extends continuously along the complete longitudinal axis/width $W_{AG}$ of the annular groove 82. However, it should be understood that in other embodiments, the curvature of the spherical raceway surface 84 may be defined by a constant radius which extends only along a substantial portion of longitudinal axis/width $W_{AG}$ of the annular groove 82, such as greater than 90% of the longitudinal axis/width $W_{AG}$ of the annular groove 82.

The outer race 74 may be formed unitary with the housing 20 (i.e. as a single component) or, more particularly, may be formed as a separate component. As shown, outer race 74 is formed as a separate component from housing 20, particularly as a single piece annular outer ring 86. Outer ring 86 is mechanically coupled to the housing 20 such that the outer ring 86 remains in a fixed position relative to the housing 20. The outer ring 86 may be mechanically coupled to the housing 20 via an interference (press) fit.

Outer ring 86 may comprise one or more of the following materials: martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Outer ring 86 may also essentially consist of, or consist of, martensitic stainless steel (e.g. BG42, Cronidur 30, XD15NW), carburizing stainless steel (e.g. CSS-42L, Pyrowear 675), powder metal high speed steel (e.g. Rex 20, Rex 76, ASP 2042, ASP 2060), nickel/cobalt base alloy (e.g. MP159), nickel base alloy (e.g. Inconel 718), cobalt base alloy (e.g. Stellite 6, Stellite 19, Stellite 190, Tribaloy 800) and ceramic (e.g. silicon nitride, partially stabilized zirconia, fully stabilized zirconia, silicon carbide and alumina).

Outer ring 86 further comprises a cylindrical raceway surface 88. As shown, the cylindrical raceway surface 88 of outer ring 86 extends along the longitudinal axis/width $W_{OR}$ of the outer ring 86 and completely around the inner circumference of the outer ring 86.

In contrast to the outer ring 56 of the fixed bearing 32, wherein the raceway surface 58 of outer ring 56 has a curvature which is substantially the same or greater than the curvature of the roller surface 48 of spherical roller 46, the raceway surface 88 of outer ring 86 of the floating bearing 34 does not have a curvature which is substantially the same or greater than the curvature of the raceway surface 88 of spherical roller 76. Such distinction will be discussed in greater detail below.

The floating bearing 34 may additionally include a cage 90, which separates the spherical rollers 70 from each other. A possible mechanical means to hold the outer ring 86 of the floating bearing 34 in the housing 20 may be cover 92. A possible mechanical means to hold the inner ring 80 of the floating bearing 34 to the shaft 14 may be fastener (nut) 94.

Figure 2C:
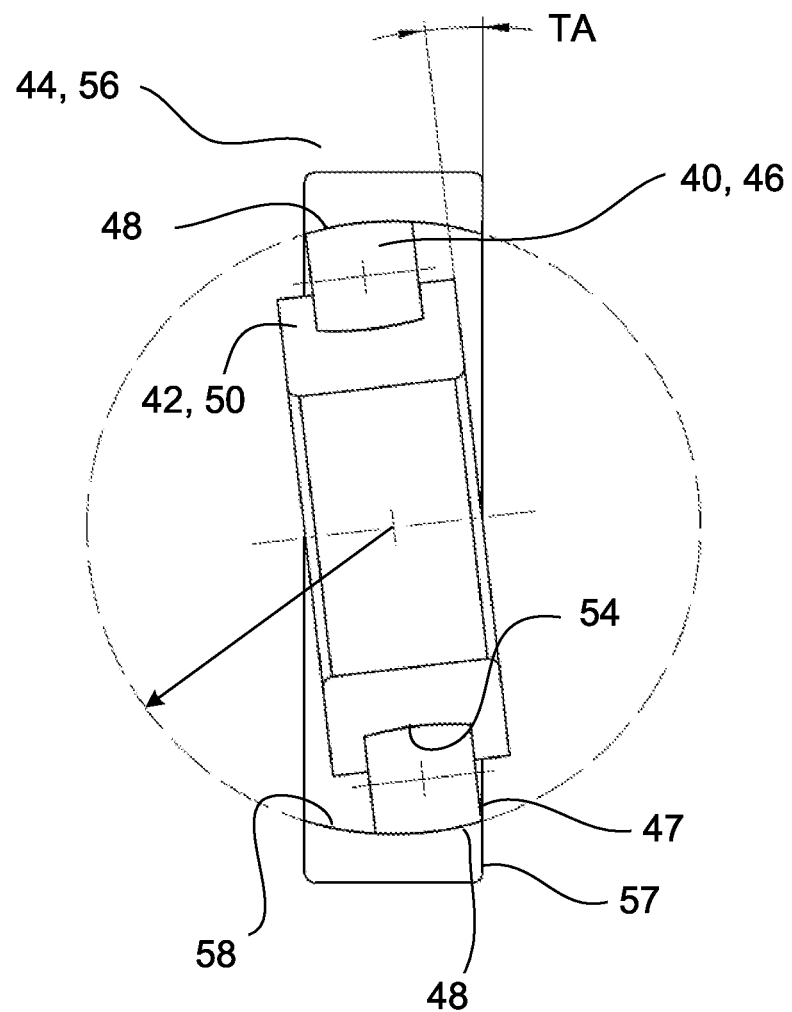
FIG. 2C depicts a cross-sectional view of the fixed bearing of the rolling bearing system of FIG. 2A with the inner ring at a maximum tilt angle relative to the outer ring.

Referring more particularly to FIGS. 2A-2C, there is shown a cross-sectional view of the fixed bearing 32 of FIG. 1 mounted to the shaft 14 in two different kinematic situations. The different kinematic situations may be understood to be associated with the hot-air valve 10 being in an open configuration/position in FIG. 2A, and the hot-air valve 10 being in a close configuration/position in FIG. 2B.

As shown in FIG. 2A, the inner ring 50 is in alignment with the outer ring 56. In other words, when the inner ring 50 is in alignment with the outer ring 56, each of the inner ring 50, spherical rollers 46 and outer ring 56 have a transverse center plane TCP which is the same plane, which is shown perpendicular to the longitudinal axis LA. However, in FIG. 2B, when shaft 14 is shown to bend/deflect (particularly as a result of the hot-air valve being closed 10 and the hot-air 18 applying force/pressure to valve baffle 12), only the inner ring 50 and the spherical rollers 46 have a common transverse center plane TCP.

As shown in FIG. 2B, in contrast to FIG. 2A, the inner ring 50 and spherical rollers 46 are no longer aligned with the outer ring 56 as set forth above with respect to FIG. 2A. More particularly, due to the bending of the shaft 14, the transverse center plane of the inner ring $TCP_{IR}$ and the transverse center plane of the spherical rollers $TCP_{IR}$ are each tilted about their intersection with the longitudinal axis LA, shown at center (pivot) axis A, such that they are no longer in the same plane as the transverse center plane of the outer ring $TCP_{OR}$. As shown, the transverse center plane of the inner ring $TCP_{IR}$ and the transverse center plane of the spherical rollers $TCP_{SR}$ are tilted at a tilt angle TA relative to the transverse center plane of the outer ring $TCP_{OR}$. As best shown by FIG. 2C, with the arrangement, a maximum tilt angle TA may be achieved when a longitudinal end 47 of the spherical roller 46 makes contact with the longitudinal end 57 of the outer ring 56. For the present application, the tilt angle TA may range from plus or minus 6 degrees (i.e. +/−6 degrees), and more particularly plus or minus 2 degrees (i.e. +/−2 degrees).

Based on the design presented above, the inner ring 50, the spherical rollers 46 and the optional cage 60 are able to tilt about center (pivot) axis A relatively to the outer ring 56 as shown in FIG. 2B. As a result, possible bending of the shaft 14 may be compensated for without losing bearing functionality, without generating additional internal loads between the spherical rollers 46.

Referring now more particularly to FIGS. 3A-3D, there is shown a cross-sectional view of the floating bearing 34 of FIG. 1 mounted to the shaft 14 in three different kinematic situations. The different kinematic situations may be understood to be associated with the hot-air valve 10 being in an open configuration/position in FIG. 3A, and the hot-air valve 10 being in a close configuration/position in FIGS. 3B and 3C.

As shown in FIG. 3A, the inner ring 80 is in alignment with the outer ring 86. In other words, when the inner ring 80 is in alignment with the outer ring 86, each of the inner ring 80, spherical rollers 76 and outer ring 86 have a transverse center plane TCP which is the same plane, which is shown perpendicular to the longitudinal axis LA. However, in FIG. 3B, when shaft 14 is shown to bend/deflect (particularly as a result of the hot-air valve being closed 10 and the hot-air 18 applying force/pressure to valve baffle 12), only the inner ring 80 and the spherical rollers 76 have a common transverse center plane TCP.

Figure 3D:
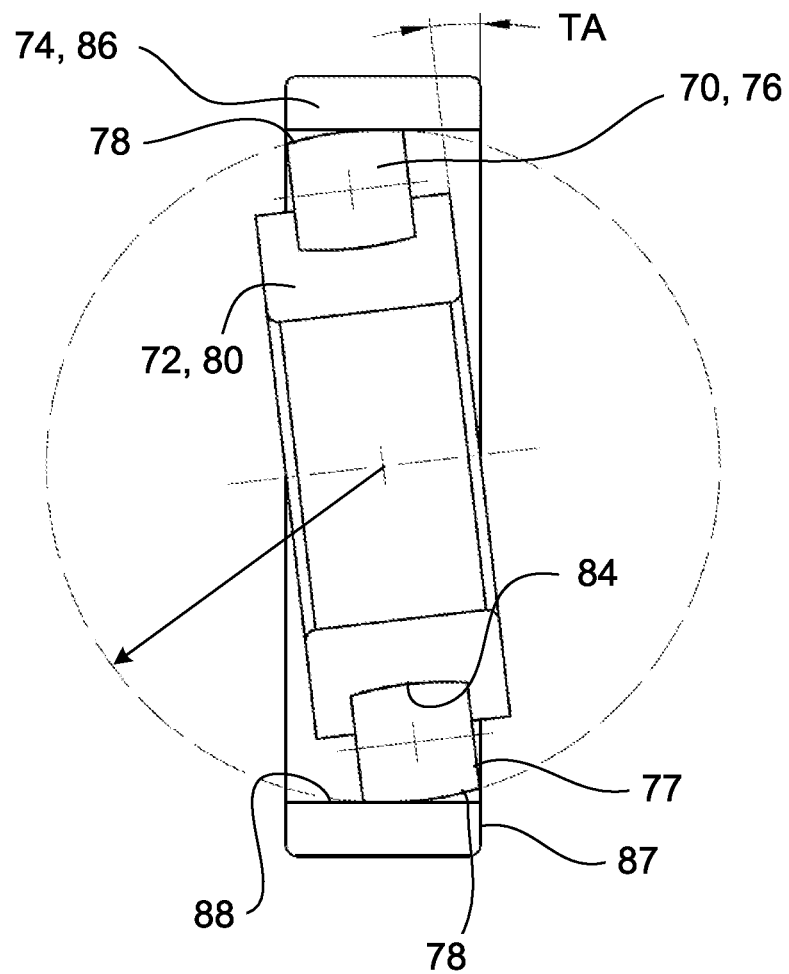
FIG. 3D depicts a cross-sectional view of the floating bearing of the rolling bearing system of FIG. 3A with the inner ring at a maximum tilt angle relative to the outer ring.

As shown in FIG. 3B, in contrast to FIG. 3A, the inner ring 80 and spherical rollers 76 are no longer aligned with the outer ring 86 as set forth above with respect to FIG. 3A. More particularly, due to the bending of the shaft 14, the transverse center plane of the inner ring $TCP_{IR}$ and the transverse center plane of the spherical rollers $TCP_{SR}$ are each tilted about their intersection with the longitudinal axis LA, shown at center (pivot) axis B, such that they are no longer in the same plane as the transverse center plane of the outer ring $TCP_{OR}$. As shown, the transverse center plane of the inner ring $TCP_{IR}$ and the transverse center plane of the spherical rollers $TCP_{SR}$ are tilted at a tilt angle TA relative to the transverse center plane of the outer ring $TCP_{OR}$. As best shown by FIG. 3D, with the arrangement, a maximum tilt angle TA may be achieved when a longitudinal end 77 of the spherical roller 76 makes contact with the longitudinal end 87 of the outer ring 86. For the present application, the tilt angle TA may range from plus or minus 6 degrees (i.e. +/−6 degrees), and more particularly plus or minus 2 degrees (i.e. +/−2 degrees).

Referring now to FIG. 3C, as set forth above, outer ring 86 of floating bearing 34 comprises a cylindrical raceway surface 88, whereas the outer ring 56 of fixed bearing 32 comprises a spherical raceway surface 58. As such, inner ring 80 and rollers 76 are able to be displaced axially and travel along the longitudinal axis within and relative to the outer ring 86, particularly in response to axial displacement of shaft 14. Inner ring 80 and rollers 76 may travel axially as shown by axial displacement AD.

Based on the design presented above, the inner ring 80, the spherical rollers 76 and the optional cage 90 are able to tilt and tilt about pivot axis B relatively to the outer ring 86 as shown in FIG. 3B. As a result, possible bending of the shaft 14 therefore may be compensated without losing bearing functionality and without generating additional internal loads between the spherical rollers 76. In addition, since the raceway surface 88 of the outer ring 86 is cylindrical, the inner ring 80, the spherical rollers 76 and the optional cage 90 are able to move axially with axial displacement AD relatively to the outer ring 86. Axial displacement AD and tilting are possible at the same time without losing bearing functionality and without generating additional internal loads between the bearing elements as shown in FIG. 3C.

Figure 4:
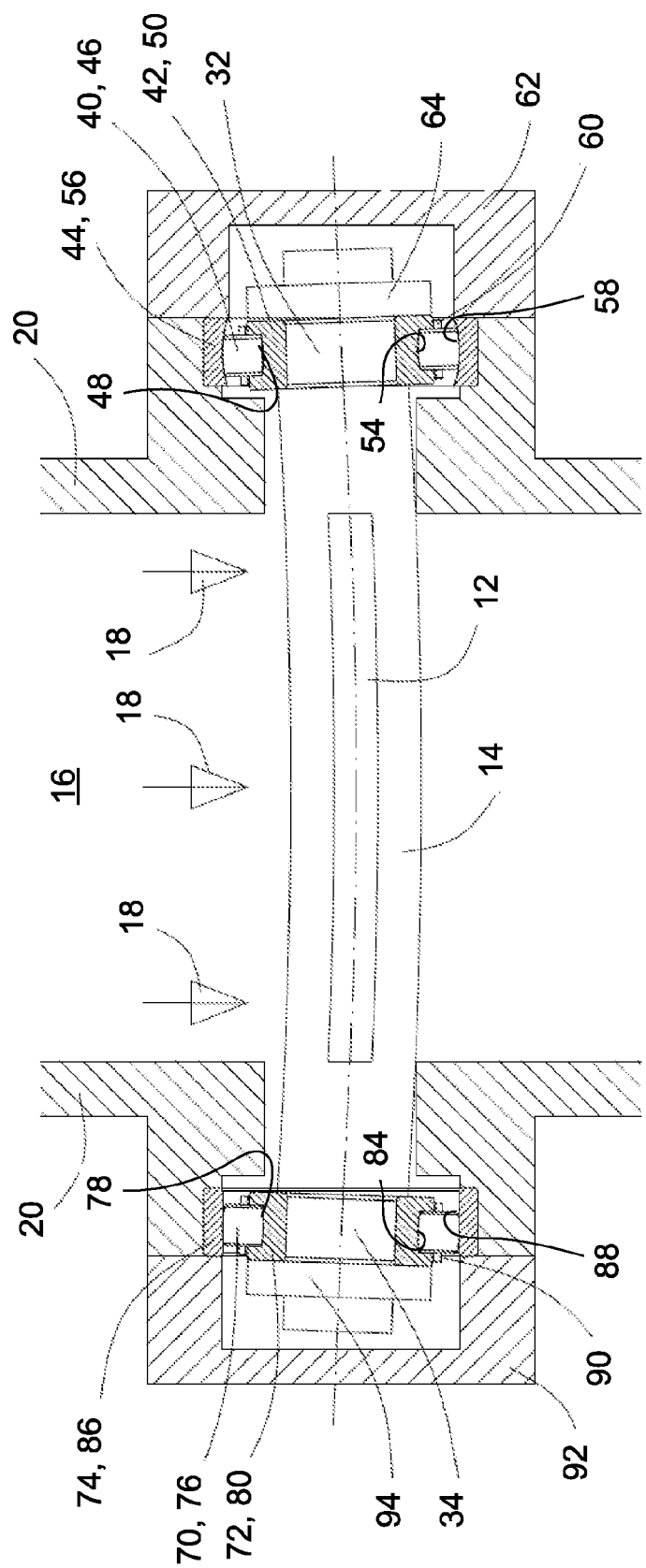
FIG. 4 depicts a cross-sectional view of the hot-air valve of FIG. 1 in a closed configuration/position with the rolling bearing system constructed in accordance with the present disclosure.

FIG. 4 depicts a cross-sectional view of the hot-air valve 10 of FIG. 1 in closed configuration/position. Resulting from a quarter-turn of the shaft 14 with the attached valve baffle 12 and the inner rings 50 and 80 of the bearings 32 and 34, respectively, relative to the housing 3 and the outer rings 56 and 86 of the bearings 32 and 34, respectively, the valve baffle 12 closes the tubular passage 16 of the housing 20 and stops the gas flow 18. As a result, gas pressure is building up on one side of the valve baffle 12, which results a bending of shaft 14 and valve disc 13.

By tilting the inner rings 50 and 80, the spherical rollers 46 and 76 and the optional cages 60 and 90 relatively to the outer rings 56 and 86 of the fixed bearing 32 and the floating bearing 34, respectively, the bending of the shaft 14 is compensated for in the fixed bearing 32 and the floating bearing 34. Additionally, the floating bearing 34 compensates different temperature induced linear expansion of shaft 14 and housing 20 by axial movement of the inner ring 80, the spherical rollers 76 and the possible cage 90 relatively to the outer ring 86. Both bending of the shaft 14 and linear thermal expansion of the shaft 14 relative to housing 20 is compensated by the bearing system without losing bearing functionality and without inducing additional loads onto the bearing rings 50, 80, 56, 86, the spherical rollers 46, 76 and the optional cages 60, 90. All four rings of the bearing system, i.e. inner ring 50, inner ring 80, outer ring 56 and outer ring 86, remain fixed to the housing 20 and to the shaft 14 or may be integral with housing 20 and shaft 14. A possible mechanical means of a fixture of the outer bearing rings 56 and 86 to the housing may be covers 62 and 92, while a possible mechanical means of a fixture of the inner rings 50 and 80 to the shaft 14 may be fasteners (nuts) 64 and 94.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A bearing system, comprising:
a fixed roller bearing and a floating roller bearing;
wherein the fixed roller bearing comprises
a fixed bearing inner raceway having a width formed by a spherical surface, wherein the spherical surface is defined by a radius;
a fixed bearing outer raceway having a width formed by a spherical surface, wherein the spherical surface is defined by a radius;
a plurality of fixed bearing spherical rollers located between the fixed bearing inner raceway and the fixed bearing outer raceway;
wherein the floating roller bearing comprises
a floating bearing inner raceway having a width formed by a spherical surface, wherein the spherical surface is defined by a radius;
a floating bearing outer raceway having a width formed by a cylindrical surface; and
a plurality of floating bearing spherical rollers located between the floating bearing inner raceway and the floating bearing outer raceway;
wherein both the fixed bearing outer raceway and the floating bearing outer raceway are fixed relative to a housing.

2. The bearing system of claim 1 wherein:
at least one of the fixed bearing spherical rollers and the floating bearing spherical rollers are formed of at least one of a martensitic stainless steel, a nickel/cobalt base alloy and a ceramic.

3. The bearing system of claim 1 wherein:
the fixed bearing inner raceway is formed on a fixed bearing inner ring; and
the fixed bearing outer raceway is formed on a fixed bearing outer ring.

4. The bearing system of claim 3 wherein:
the fixed bearing inner ring, when assembled in the fixed bearing outer ring, is tiltable in the fixed bearing outer ring relative to an axis of rotation of the fixed bearing; and
wherein the fixed bearing inner ring is tiltable at a tilt angle of 2 degrees to 6 degrees.

5. The bearing system of claim 3 wherein:
at least one of the fixed bearing inner ring and the fixed bearing outer ring is formed of at least one of a martensitic stainless steel, a carburizing stainless steel, a powder metal high speed steel, a nickel/cobalt base alloy, a nickel base alloy, a cobalt base alloy, and a ceramic.

6. The bearing system of claim 1 wherein:
the floating bearing inner raceway is formed on a floating bearing inner ring; and
the floating bearing outer raceway is formed on a floating bearing outer ring.

7. The bearing system of claim 6 wherein:
the floating bearing inner ring, when assembled in the floating bearing outer ring, is tiltable in the floating bearing outer ring relative to an axis of rotation of the floating bearing; and
wherein the floating bearing inner ring is tiltable at a tilt angle of 2 degrees to 6 degrees.

8. The bearing system of claim 6 wherein:
at least one of the floating bearing inner ring and the floating bearing outer ring is formed of at least one of a martensitic stainless steel, a carburizing stainless steel, a powder metal high speed steel, a nickel/cobalt base alloy, a nickel base alloy, a cobalt base alloy, and a ceramic.

9. The bearing system of claim 1 wherein:
at least one of the fixed bearing and the floating bearing further comprises a bearing cage.

10. A hot-air valve, comprising:
a shaft rotatable on at least two bearings located within a housing;
wherein a first bearing of the two bearings is a fixed roller bearing and a second bearing of the two bearings is a floating roller bearing;
wherein the fixed roller bearing comprises
a fixed bearing inner raceway having a width formed by a spherical surface, wherein the spherical surface is defined by a radius;
a fixed bearing outer raceway having a width formed by a spherical surface, wherein the spherical surface is defined by a radius;
a plurality of fixed bearing spherical rollers located between the fixed bearing inner raceway and the fixed bearing outer raceway;
wherein the floating roller bearing comprises
a floating bearing inner raceway having a width formed by a spherical surface, wherein the spherical surface is defined by a radius;
a floating bearing outer raceway having a width formed by a cylindrical surface; and
a plurality of floating bearing spherical rollers located between the floating bearing inner raceway and the floating bearing outer raceway;
wherein both the fixed bearing outer raceway and the floating bearing outer raceway are fixed relative to the housing; and
wherein the valve is operable in a temperature range of at least 219.3 K to 977.6 K, and a pressure of 3.103 MPa.

11. The hot-air valve of claim 10 wherein:
at least one of the fixed bearing spherical rollers and the floating bearing spherical rollers are formed of a ceramic.

12. The hot-air valve of claim 10 wherein:
the fixed bearing inner raceway is formed on a fixed bearing inner ring; and
the fixed bearing outer raceway is formed on a fixed bearing outer ring.

13. The hot-air valve of claim 12 wherein:
the fixed bearing inner ring, when assembled in the fixed bearing outer ring, is tiltable in the fixed bearing outer ring relative to an axis of rotation of the fixed bearing; and
wherein the fixed bearing inner ring is tiltable at a tilt angle of 2 degrees to 6 degrees.

14. The hot-air valve of claim 12 wherein:
at least one of the fixed bearing inner ring and the fixed bearing outer ring is formed of a martensitic stainless steel.

15. The hot-air valve of claim 10 wherein:
the floating bearing inner raceway is formed on a floating bearing inner ring; and
the floating bearing outer raceway is formed on a floating bearing outer ring.

16. The hot-air valve of claim 15 wherein:
the floating bearing inner ring, when assembled in the floating bearing outer ring, is tiltable in the floating bearing outer ring relative to an axis of rotation of the floating bearing; and
wherein the floating bearing inner ring is tiltable at a tilt angle of 2 degrees to 6 degrees.

17. The hot-air valve of claim 15 wherein:
at least one of the floating bearing inner ring and the floating bearing outer ring is formed of a martensitic stainless steel.

18. The hot-air valve of claim 10 wherein:
at least one of the fixed bearing and the floating bearing further comprises a bearing cage.

19. A method of operating a valve, comprising:
providing a hot-air valve, comprising:
   a shaft rotatable on at least two bearings located within a housing;
   wherein a first bearing of the two bearings is a fixed roller bearing and a second bearing of the two bearings is a floating roller bearing;
   wherein the fixed roller bearing comprises
      a fixed bearing inner raceway having a width formed by a spherical surface, wherein the spherical surface is defined by a radius;
      a fixed bearing outer raceway having a width formed by a spherical surface, wherein the spherical surface is defined by a radius;
      a plurality of fixed bearing spherical rollers located between the fixed bearing inner raceway and the fixed bearing outer raceway;
   wherein the floating roller bearing comprises
      a floating bearing inner raceway having a width formed by a spherical surface, wherein the spherical surface is defined by a radius;
      a floating bearing outer raceway having a width formed by a cylindrical surface; and
      a plurality of floating bearing spherical rollers located between the floating bearing inner raceway and the floating bearing outer raceway;
      wherein both the fixed bearing outer raceway and the floating bearing outer raceway are fixed relative to the housing;
exposing the shaft to mechanical loads which bend the shaft along an axis of rotation of the shaft;
compensating for the bending of the shaft and mechanical loads placed on the fixed bearing and floating bearing by tilting the fixed bearing inner ring in the fixed bearing outer ring relative to the axis of rotation and tilting the floating bearing inner ring in the floating bearing outer ring relative to the axis of rotation.

20. The method of claim 19 further comprising:
exposing the shaft to thermal loads which lengthen the shaft axially; and
compensating for the lengthening of the shaft by displacing the floating bearing inner ring axially within the floating bearing outer ring.

21. A method of operating a valve, comprising:
providing a hot-air valve, comprising:
   a shaft rotatable on at least two bearings located within a housing;
   wherein a first bearing of the two bearings is a fixed roller bearing and a second bearing of the two bearings is a floating roller bearing;
   wherein the fixed roller bearing comprises
      a fixed bearing inner raceway having a width formed by a spherical surface, wherein the spherical surface is defined by a radius;
      a fixed bearing outer raceway having a width formed by a spherical surface, wherein the spherical surface is defined by a radius;
      a plurality of fixed bearing spherical rollers located between the fixed bearing inner raceway and the fixed bearing outer raceway;
   wherein the floating roller bearing comprises
      a floating bearing inner raceway having a width formed by a spherical surface, wherein the spherical surface is defined by a radius;
      a floating bearing outer raceway having a width formed by a cylindrical surface; and
      a plurality of floating bearing spherical rollers located between the floating bearing inner raceway and the floating bearing outer raceway;
      wherein both the fixed bearing outer raceway and the floating bearing outer raceway are fixed relative to the housing;
exposing the shaft to thermal loads which lengthen the shaft axially; and
compensating for the lengthening of the shaft by displacing the floating bearing inner ring axially within the floating bearing outer ring.

22. The method of claim 21 further comprising:
tilting the fixed bearing inner ring in the fixed bearing outer ring relative to the axis of rotation and tilting the floating bearing inner ring in the floating bearing outer ring relative to the axis of rotation.

* * * * *